United States Patent [19]

Kluttz

[11] Patent Number: 4,994,511

[45] Date of Patent: Feb. 19, 1991

[54] POLYKETONE STABILIZATION WITH DIHYDROCARBYLDITHIOCARBAMATE SALTS

[75] Inventor: Robert Q. Kluttz, Houston, Tex.

[73] Assignee: Shell Oil Company, Houston, Tex.

[21] Appl. No.: 428,479

[22] Filed: Oct. 30, 1989

Related U.S. Application Data

[63] Continuation of Ser. No. 95,737, Sep. 14, 1987, abandoned.

[51] Int. Cl.$^5$ .............................................. C08K 5/36
[52] U.S. Cl. .................................... 524/202; 524/99; 524/102
[58] Field of Search .................... 524/202, 99, 102

[56] References Cited

U.S. PATENT DOCUMENTS

| | | | |
|---|---|---|---|
| 2,495,286 | 1/1950 | Brubaker | 260/63 |
| 3,676,401 | 7/1972 | Henry | 523/126 |
| 3,694,412 | 9/1972 | Nozaki | 260/63 |
| 3,753,952 | 8/1973 | Guillet | 528/392 |
| 3,843,595 | 10/1974 | Mathis | 260/45.75 |
| 3,929,727 | 12/1975 | Russell | 260/45.95 |
| 3,941,759 | 3/1976 | Taylor et al. | 524/202 |
| 3,948,832 | 4/1976 | Hudgin | 528/392 |
| 3,948,850 | 4/1976 | Hudgin | 260/45.7 |
| 3,968,082 | 7/1976 | Hudgin | 260/45.8 |
| 4,006,119 | 2/1977 | Beadle | 524/202 |
| 4,024,104 | 5/1977 | Russell | 260/45.8 |
| 4,130,081 | 11/1983 | Mathis | 524/202 |
| 4,139,522 | 2/1979 | Lantor | 260/45.7 |
| 4,532,011 | 6/1985 | Colvin | 203/9 |

FOREIGN PATENT DOCUMENTS

| | | |
|---|---|---|
| 121965 | 8/1984 | European Pat. Off. . |
| 165005 | 12/1985 | European Pat. Off. . |
| 181014 | 5/1986 | European Pat. Off. . |
| 46-02177 | 1/1971 | Japan . |
| 50-126096 | 10/1975 | Japan . |
| 55-086831 | 7/1980 | Japan . |
| 56-135545 | 10/1981 | Japan . |
| 56-135546 | 10/1981 | Japan . |
| 58-21438 | 2/1983 | Japan . |
| 58-194937 | 11/1983 | Japan . |
| 59-066495 | 4/1984 | Japan . |
| 647322 | 2/1979 | U.S.S.R. . |
| 859396 | 8/1981 | U.S.S.R. . |
| 870420 | 10/1981 | U.S.S.R. . |
| 684976 | 12/1952 | United Kingdom . |
| 1081304 | 3/1965 | United Kingdom . |
| 1163875 | 9/1969 | United Kingdom . |

OTHER PUBLICATIONS

Advances in Polymer Science-(1986) 73-4, 125-44.

*Primary Examiner*—Veronica P. Hoke

[57] ABSTRACT

The thermal oxidative stability of polyketones is improved by the addition of a dihydrocarbyldithiocarbamate salt of a metal selected from Group IIIB through Group VA or a mixture thereof.

18 Claims, No Drawings

POLYKETONE STABILIZATION WITH DIHYDROCARBYLDITHIOCARBAMATE SALTS

This is a continuation of application Ser. No. 095,737, filed Sept. 14, 1987, now abandoned.

FIELD OF THE INVENTION

The invention relates to compositions comprising polymers of carbon monoxide and at least one olefinically unsaturated organic compound, which compositions have improved thermal oxidative stability. In particular, the invention relates to compositions comprising linear alternating polymers of carbon monoxide and at least one olefinically unsaturated hydrocarbon which have improved thermal oxidative stability.

BACKGROUND OF THE INVENTION

Polymers of carbon monoxide and olefinically unsaturated organic compounds, or polyketones, have been known and available in limited quantities for many years. For example, polymers of ethylene or ethylene-propylene which contain small quantities of carbon monoxide are disclosed in U.S. Pat. No. 2,495,286, prepared using free radical catalysts. British Pat. No. 1,081,304 discloses polymers containing higher concentrations of carbon monoxide prepared using alkylphosphine complexes of palladium salts as catalysts. A special class of linear polyketones is disclosed in U.S. Pat. No. 3,694,412, wherein the monomer units of carbon monoxide and olefinically unsaturated hydrocarbons occur in alternating order.

Polyketones are of considerable interest because they exhibit good physical properties. In particular, the high molecular weight linear alternating polymers have potential use as engineering thermoplastics due to their high strength, rigidity and impact resistance. These polymers can be represented by the general formula

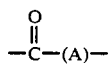

wherein A is the moiety obtained by polymerization of the olefinically unsaturated organic compound through the olefinic unsaturation. A general process for preparing such linear alternating polymers is disclosed, for example, in published European Patent Applications 121,965 and 181,014. The process comprises contacting the monomers in the presence of a catalyst obtained by reacting a compound of palladium, cobalt or nickel, the anion of a non-hydrohalogenic acid having a pKa less than about 2, and a bidentate ligand of phosphorus, arsenic or antimony. The resulting linear alternating polymers are generally high molecular weight thermoplastic polymers having utility in the production of articles for food and drink containers and for automobile parts. Although the properties of the polyketones are suitable for many applications, polyketones have the disadvantage of poor resistance to thermal oxidative degradation which limits their use in high temperature applications. For example, discoloration and decomposition take place when the polymers are exposed to elevated temperatures in the presence of air. The polymers crosslink, undergo chain scission, form undesirable degradation products, and rapidly lose attractive physical properties.

It is desirable to find compositions of polyketones that can withstand the thermal oxidative conditions encountered in higher temperature applications.

SUMMARY OF THE INVENTION

The invention relates to polymeric compositions comprising a polymer of carbon monoxide and at least one olefinically unsaturated organic compound which have improved resistance to thermal oxidative degradation. According to the invention, the thermal oxidative stability of a polyketone is improved by the addition of an effective stabilizing amount of at least one dihydrocarbyldithiocarbamate salt of a metal selected from Group IIIB through Group VA of the Periodic Table of Elements from the Handbook of Chemistry and Physics, 67th Edition, 1986. In particular, the thermal oxidative stability of a linear alternating polymer of carbon monoxide and at least one olefinically unsaturated hydrocarbon is improved by the addition of an effectively stabilizing amount of at least one dihydrocarbyldithiocarbamate salt of a metal selected from Group IIIB through Group VA.

The invention is therefore a polymeric composition comprising a polymer of carbon monoxide and at least one olefinically unsaturated organic compound containing an effective stabilizing amount of a dihydrocarbyldithiocarbamate salt having formula I

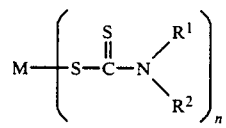

wherein $R^1$ and $R^2$ independently represent hydrocarbyl groups having from about 1 to about 20 carbon atoms, M is a metal selected from the group consisting of metals of Group IIIB through VA and mixtures thereof, and n is an integer equal to at least 1.

The invention is also a process for improving the thermal oxidative stability of a polymer of carbon monoxide and at least one olefinically unsaturated organic compound which process comprises incorporating an effective stabilizing amount of a dihydrocarbyldithiocarbamate salt having the formula I as defined above.

The invention further relates to molded or extruded articles comprising the products of the process of the invention.

DESCRIPTION OF THE INVENTION

The polymers of carbon monoxide and olefinically unsaturated organic compounds, i.e., polyketones, suitable for stabilization according to the invention are those having molecular weights in the range of about 100 to about 1 million or more and containing up to about 50 weight percent carbon monoxide. Preferred polyketones are the copolymers of carbon monoxide and olefinically unsaturated hydrocarbons, in particular ethylene, which copolymers contain up to about 50 weight percent carbon monoxide. The preferred molecular weight of the polyketones is about 1,000 to about 200,000, more preferably 10,000 to 50,000.

Suitable olefinically unsaturated organic compounds for preparing polyketones by polymerization with carbon monoxide are those organic compounds which contain a C=C linkage. Examples of suitable olefinically unsaturated organic compounds are olefinically unsaturated hydrocarbons. Also suitable are olefinically unsaturated organic compounds comprising a hydrocarbon containing a C=C linkage and further comprising heteroatoms such as oxygen, nitrogen and halogens. Examples of suitable olefinically unsaturated organic compounds coming within the scope of the present invention include aliphatic monoolefins of the general formula $C_xH_y$, such as ethylene, propylene, butylene, isobutylene and amylene; arylaliphatic monoolefins having an aryl moiety on an aliphatic molecule such as styrene and alpha-methyl styrene; diolefins such as butadiene and isoprene; vinyl esters and acetals such as vinylacetate and vinyl dimethylacetate; acrylic and methacrylic acids and esters.

Preferred olefinically unsaturated organic compounds are olefinically unsaturated hydrocarbons of from 2 to 20 carbon atoms inclusive, preferably 2 to 12 carbon atoms inclusive. Preferred hydrocarbons are aliphatic monoolefins having the general formula $C_xH_{2x}$. More preferred are alpha-olefins, in particular alpha-olefins having from two to twelve carbon atoms. A particularly preferred alpha-olefin is ethylene.

Processes for the preparation of polyketones have been described in detail in a number of patents and other publications. For example, polyketones are disclosed generally in Kirk-Othmer Encyclopedia of Chemical Technology, Second Edition, Vol. 12, p. 132, 1967, and in Encyclopedia of Polymer Science and Technology, 1968, Vol. 9, 397–402. Polymers of carbon monoxide with ethylene and other olefinically unsaturated organic compounds in which all of the monomer units occur distributed at random within the polymer can be prepared with the aid of free radical catalysts such as peroxides and peroxy compounds as disclosed in U.S. Pat. Nos. 3,780,140, 4,070,532 and 4,543,440. High molecular weight polymers of ethylene or ethylene and propylene which contain small quantities of carbon monoxide can be prepared with the aid of Ziegler catalysts as disclosed in U.K. Pat. No. 925,130 and U.S. Pat. No. 4,473,482.

Linear alternating polyketones suitable for use in the invention can be prepared with the aid of phosphorus-, arsenic-, antimony-, or cyanogen-containing compounds of palladium, cobalt or nickel as catalysts. Processes using such catalysts are disclosed, for example, in U.S. Pat. Nos. 3,689,460, 3,835,123, 3,984,388 and 4,076,911 which patents are incorporated here by reference. Other processes to prepare linear alternating polyketones are disclosed, for example, in the article *Advances in Polymer Science* 1986, 73–4, 125–44. Very low molecular weight polyketones, e.g. up to about 400 molecular weight, may also be prepared by known conventional organic syntheses.

Although the method by which the polymers of this description are prepared is not critical, preferably the polyketone to be stabilized according to the invention is a linear alternating polyketone prepared by contacting carbon monoxide and an olefinically unsaturated hydrocarbon(s) under polymerization conditions in the presence of a catalyst obtained by reacting a compound of palladium, cobalt or nickel, an anion of a non-hydrohalogenic acid having a pKa less than about 6, preferably less than about 2, and certain bidentate ligands of nitrogen or of phosphorus, arsenic or antimony. Such a process for preparing polyketones is disclosed, for example, in published European Patent Applications 121,965 and 181,014. In a preferred method of preparing the polyketone polymer, the metal compound is palladium acetate, the anion is the anion of trifluoroacetic acid or para-toluenesulfonic acid and the bidentate ligand is 1,3-bis(diphenylphosphino)propane or 1,3-bis[di(2-methoxyphenyl)phosphino]propane.

Polymerization is typically carried out at elevated temperature and pressure in the gaseous phase in the substantial absence of a reaction diluent or in the liquid phase in the presence of a reaction diluent such as a lower alcohol, e.g., methanol or ethanol. The reactants and catalyst are contacted by conventional methods such as shaking or stirring and subsequent to reaction the polymer product is recovered as by filtration or decantation. The polymer product will, on occasion, contain metal or other residues of the catalyst which may be removed, if desired, by treatment of the polymer product with a solvent which is selective for the residues.

The physical properties of the linear alternating polyketone polymers will be in part determined by the molecular weight, whether the polymer is a copolymer or terpolymer, and which unsaturated hydrocarbons have been employed in its preparation. Typical melting points for the polymers are from about 175° C. to about 300° C., more frequently from about 210° C. to about 260° C. The preferred polymers have substantially equal molar quantities of carbon monoxide and olefinically unsaturated hydrocarbons. The polymer chain will have end groups which depend upon the particular components present during the polymerization and how the polymer is processed during any subsequent purification. The precise nature of such end groups or "caps" is not critical, however, and the polymeric polyketones are fairly depicted by the description of the polymer chain.

The preferred linear alternating polyketone polymer comprises carbon monoxide and a monoolefin as the olefinically unsaturated hydrocarbon, preferably ethylene. If the linear alternating polyketone comprises more than one olefinically unsaturated hydrocarbon it is preferred that each unsaturated hydrocarbon is a hydrocarbyl monoolefin, in particular an alpha-olefin. Preferably such a polyketone comprises ethylene and at least one monoolefin, more preferably ethylene and at least one alphaolefin. It is still more preferred that such a polyketone comprise ethylene and propylene.

When the linear linear alternating polyketone polymer is prepared from carbon monoxide and ethylene then the polymer will be a copolymer consisting of units with the formula II

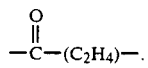     II

When the linear alternating polymer is prepared from a monomer mixture which, in addition to carbon monoxide and ethylene, comprises a second olefinically unsaturated hydrocarbon having the general formula $C_xH_y$, e.g., propylene, then terpolymers are prepared having units of the formula II

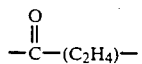     II and units of the formula III

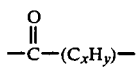

occurring randomly distributed throughout the polymer chains. The structures of the copolymers and terpolymers differ only in that a group $-(C_xH_y)-$ is encountered at random places in the terpolymer instead of a $-(C_2H_4)-$ group. By way of further illustration, when the second olefinically unsaturated hydrocarbon is propylene, the unit $C_xH_y$ will be

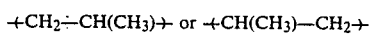

depending upon the stereochemistry of the polymerization. The polyketone terpolymers of the invention will contain both types of $C_xH_y$ unit randomly occurring along the polymer chain.

The units of formula II

and the units of formula III

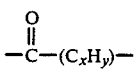

will also occur randomly throughout the polymer chain although the ratio of units III:II will be up to about 0.5. Typically there will be from about 1 to about 400 units of formula II per unit of formula III, preferably from about 10 to about 100 units of formula II per unit of formula III. In the modification of the invention which employs copolymers of carbon monoxide and ethylene without the presence of a second olefinically unsaturated hydrocarbon, the ratio of the units is 0.

The compounds useful as thermal oxidative stabilizers for polyketones according to the invention can be any of the group of dihydrocarbyldithiocarbamate salts of transition metals, Group IIIB through Group VA metals or mixtures thereof. The dihydrocarbyldithiocarbamate salts can be expressed by the general formula I

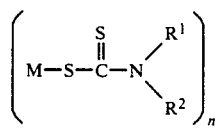

wherein $R^1$ and $R^2$ independently represent hydrocarbyl groups having from about 1 to about 20 carbon atoms, preferably from about 1 to about 6 carbon atoms, M is a metal selected from the group consisting of metals of Group IIIB through Group VA metals and mixtures thereof, and n is an integer equal to or greater than 1.

$R^1$ and $R^2$ may be the same or different hydrocarbyl groups each time they appear in formula I. For example, a dihydrocarbyldithiocarbamate salt of formula I where n equals 2 may also be written as general formula IV

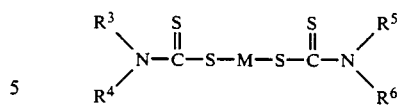

wherein M is the same as previously defined and $R^3$, $R^4$, $R^5$ and $R^6$ individually represent hydrocarbyl groups having from about 1 to about 20 carbon atoms, preferably from about 1 to about 6 carbon atoms.

$R^1$ and $R^2$ may also together form a hydrocarbyl group such that the dihydrocarbyldithiocarbamate of formula I contains a cyclic structure. For example, $R^1$ and $R^2$ may together form a group $-(CH_2)_m-$ as in formula V, wherein m is an integer of at least 4,

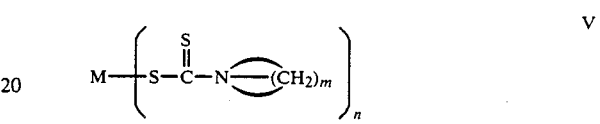

Hydrocarbyl is defined here as a organic radical containing at least carbon and hydrogen atoms. Suitable organic radicals include hydrocarbon groups. Also suitable are organic radicals comprising a hydrocarbon group and further comprising heteroatoms such as oxygen and nitrogen. Examples of suitable hydrocarbon groups include acyclic hydrocarbon groups having from about 1 to about 20 carbon atoms or cyclic hydrocarbon groups having from about 5 to about 20 carbon atoms. The hydrocarbon groups may be aliphatic, meaning straight or branched hydrocarbon chains, or cycloaliphatic, such as cycloalkyl or cycloalkenyl. The hydrocarbon group may also be aromatic.

Organic radicals suitable as a hydrocarbyl include the hydrocarbon groups alkyl, alkenyl, alkynyl and aryl. Aryl refers here to any aromatic hydrocarbon. Alkyl-, alkenyl-, and alKynyl-substituted aromatic groups or aromatic substituted alkyl, alkenyl and alkynyl groups are also suitable. Examples of hydrocarbon groups suitable for use in the invention include, for example, the alkyl groups methyl, ethyl and butyl and the aryl groups phenyl and tolyl. A suitable aromatic substituted alkyl group is a benzyl group. Examples of suitable hydrocarbon groups containing heteroatoms include piperidyl and pyridinyl groups.

The preferred hydrocarbyl is a hydrocarbon group having from about 1 to about 8 carbon atoms. More preferred hydrocarbyls are alkyl groups having from 1 to about 6 carbon atoms such as methyl, ethyl and butyl.

The dihydrocarbyldithiocarbamates suitable for use in the invention are the salts of metals from Group IIIB through Group VA of the Periodic Table of Elements, 67th Edition, 1986. A mixture of dihydrocarbyldithiocarbamate metal salts may also be used. The metals of Group IIIB through Group VA suitable for use in the invention include the transition metals consisting of the elements of Group IB through VIIB, Group VIII, the actinides and lanthanides. The transition metals may be characterized as those elements having partly filled d or f electron shells as described in "Advanced Inorganic Chemistry", 4th Ed.; Cotton, F. A. and Wilkinson, G.; John Wiley & Sons, 1980; Chapter 20. The transition metals include elements 21 through 29 (scandium through copper), 39 through 47 (yttrium through silver), 57 through 79 (lanthanum through gold) and all known elements from 89 (actinium) on. Also suitable for use in the invention are the metals of Group IIB consisting of zinc, cadium and mercury which are included here as transition metals. The Group IIIA through VA metals suitable for use in the invention are the metals of the representative elements other than alkali metals. The Group IIA alkaline earth metals, such as magnesium, are also suitable for use in the invention but it is preferred to use metals of the representative elements other than alkaline earth metals and alkali metals. The representative metals other than alkali metals and alkaline earth metals include the Group IIIA elements aluminum, gallium, indium and thallium, the Group IVA metals tin and lead, and the Group VA metal bismuth. The preferred metals for use in the invention are the transition metals nickel, cobalt, iron, and copper, and the Group IIB metals zinc, and cadmium. More preferred are the transition metals nickel and zinc. The preferred representative metals are lead and bismuth. The more preferred representative metal is lead.

Although the method of preparing the dihydrocarbyldithiocarbamate salts useful in the invention is not critical, it is desirable that the salts be substantially free of residual alkali metal ions. Preferably, the dihydrocarbyldithiocarbamate salts used in the invention have less than about 0.1% w alkali metal present in ionic form. More preferred are dihydrocarbyldithiocarbamate salts having less than about 0.01% w alkali metal ion content.

Several of the dihydrocarbyldithiocarbamate salts are available commercially, for example, from Vanderbilt Rubber Company. Specific representative examples of such compounds, not intended as a limitation of the selection, include iron dimethyldithiocarbamate, nickel dimethyldithiocarbamate, nickel dibutyldithiocarbamate, copper diethyldithiocarbamate, zinc diethyldithiocarbamate, lead diethyldithiocarbamate, bismuth diethyldithiocarbamate and cadmium diethyldithiocarbamate. The preferred dihydrocarbyldithiocarbamate transition metal salt is nickel dibutyldithiocarbamate.

Other compounds related to dihydrocarbyldithiocarbamates will also act as stabilizers for polyketones, and form novel stable polyketone compositions, although generally less preferred than the dihydrocarbyldithiocarbamate metal salts. For example, the bridged-sulfur compounds, bisdihydrocarbyldithiocarbamates, and metal or metalloid salts of dihydrocarbyldithiophosphinates are also effective as stabilizers for polyketone compositions.

The amount of stabilizer incorporated into the polyketone will be an effectively stabilizing amount of at least one metal salt of a dihydrocarbyldithiocarbamate. An effectively stabilizing amount is that finite amount of stabilizer compound sufficient to improve the thermal oxidative stability of the polymer. In general, the stabilizers of this invention are employed in an amount within the range from about 0.01 to about 10 percent based on the weight of the polyketone, preferably within the range from about 0.5 to about 5 percent, and most preferably from about 1.0 to about 3.0 percent based on the weight of the polyketone.

The stabilizer may be incorporated into the polyketone at any stage of the processing, preferably prior to being subjected to elevated temperature, or at such times as desired to improve thermal oxidative stability. The method of incorporating the stabilizer is not considered to be critical so long as the method results in a substantially uniform blend of the composition components. The stabilizer can be incorporated into the polymeric compositions by any known method, preferably after polymerization of the polymer. This is most conveniently accomplished by blending the stabilizer into the polymer which is usually in the form of fine particles. The stabilizer may be incorporated into the polymeric compositions in the form of a powder or dissolved in a solvent.

In addition to the stabilizer compounds of this invention, the compositions can contain other ingredients conventionally employed in polyketone compositions. For instance, fillers, extenders, pigments, resins and/or plasticizers, and other polymeric materials can be added to the polyketone compositions being stabilized to improve or otherwise alter the properties of the compositions.

The polymeric compositions according to the invention have good mechanical properties. They can be processed by means of the usual techniques into, among other things, films, sheets, plates, fibers and molded objects. The low molecular weight polymers in particular may be used as intermediates for the production of plastics, as components in blends with other polymers (such as waxes and greases) and as plasticizers for other polymers. The higher molecular weight polymers have use and utility as premium thermoplastics for fibers, films, injection molding, compression molding or blowing applications. Because of their properties, the higher molecular weight polymers according to the invention are suitable for many applications, such as in the auto industry, for the manufacture of packaging materials for foods and drinks, as constructional and building material, for the manufacture of cables and for a variety of applications in the domestic sphere. In order to modify their characteristics or to strengthen them, the polymeric compositions according to the invention can be employed in combination with many other sorts of materials.

The invention will now be illustrated with the aid of the following illustrative embodiment.

ILLUSTRATIVE EMBODIMENT I

Two samples of a low molecular weight polyketone, 3,6,9-undecanetrione were prepared for testing at elevated temperature. One sample was mixed with 1% w of a dihydrocarbyldithiocarbamate salt. The samples were then heated at 180° C. Aliquots were taken at one, six, and twenty four hours and monitored for degradation products. The relative percentages of polyketone starting material and degradation products were measured by quantitative high resolution gas chromatography. The results from the samples are shown in Table 1. It can be seen that the addition of a dihydrocarbyldithiocarbamate salt reduces the formation of degradation products from the polyketone.

TABLE 1

| Percentage of unchanged polyketone after heating at 180° C. | | | |
|---|---|---|---|
| | Time | | |
| | 1 hr | 6 hr | 24 hr |
| Sample a | 98.5% | 80% | 58% |
| Sample b | 99.8% | 98.7% | 86% | a. 3,6,9 undecanetrione
b. 3,6,9 undecanetrione with 1 wt % nickel dibutyldithiocarbamate

ILLUSTRATIVE EMBODIMENT II

Three samples of a linear alternating polyketone terpolymer were prepared for brittleness testing at elevated temperature. The polyketone terpolymer of carbon monoxide, ethylene and propylene was prepared in the manner disclosed in European Patent Application 181,014. The polyketone had a Limiting Viscosity Number (LVN) of 1.3 measured in m-cresol at 100° C. and a melting point of about 220° C. The polymer also contained 0.2% w Irganox 1076, a commercially available n-octadecyl ester of 3-(1-hydroxy-2,6-ditert-butylphenyl)-1-propanoic acid, as a co-stabilizer.

The sample preparation procedure consisted of powder blending the polymer with the dihydrocarbyldithiocarbamate salt followed by melt extrusion. Control samples without any dihydrocarbyldithiocarbamate stabilizer were melt extruded under identical conditions. The samples were then compression molded at 240° C. for 1.5 minutes to obtain 10 mil films for measuring the thermal oxidative stability.

The test series consisted of three samples. The first sample was a control containing no dihydrocarbyldithiocarbamate salt. The second and third samples were comparisons containing 1% w and 2% w nickel dibutyldithiocarbamate respectively. The samples were subjected to aerobic oven aging at various temperatures in a thermally controlled oven to test for brittleness. All samples were bent at an angle of 180° and the appearance of cracks was recorded as brittleness (failure). Time of heating in the oven to reach the moment of failure was determined. At one day intervals a portion of each sample of the polyketone film was removed from the oven and tested for brittleness. The results of the brittleness test are shown in Table 2.

The nickel dibutyldithiocarbamate stabilizer improved the thermal oxidative stability of the sample in comparison to the control sample without incorporated dihydrocarbyldithiocarbamate stabilizer at all three temperatures tested as measured by the amount of time elapsed until the polymer became brittle. It can also be seen that increasing the concentration of the nickel dibutyldithiocarbamate from 1% w to 2% w improved the thermal oxidative stability of the polymer an additional increment.

TABLE 2

|  | Days to failure by brittleness | | |
|---|---|---|---|
|  | 140° C. | 120° C. | 100° C. |
| Sample 1 | 1 | 3 | 16 |
| Sample 2 | 2 | 8 | 49 |
| Sample 3 | 4 | 21 | 92 |

1. polyketone
2. polyketone with 1 wt % nickel dibutyldithiocarbamate
3. polyketone with 2 wt % nickel dibutyldithiocarbamate

ILLUSTRATIVE EMBODIMENT III

When a linear alternating copolymer of carbon monoxide and ethylene having an average molecular weight of at least 10,000 and a melting point of about 257° C., is powder blended with a dihydrocarbyldithiocarbamate salt followed by melt extrusion, a composition will be recovered having an improved thermal oxidative stability. Alternatively, when a dihydrocarbyldithiocarbamate salt is dissolved in a suitable solvent and incorporated into the copolymer, followed by melt extrusion, a composition having an improved thermal oxidative stability will be recovered.

What is claimed is:

1. A polymeric composition comprising a linear alternating polymer of carbon monoxide and at least one olefinically unsaturated hydrocarbon containing an effective stabilizing amount of a dihydrocarbyldithiocarbamate salt sufficient to improve thermal oxidative stability of the polymer, said salt having the formula

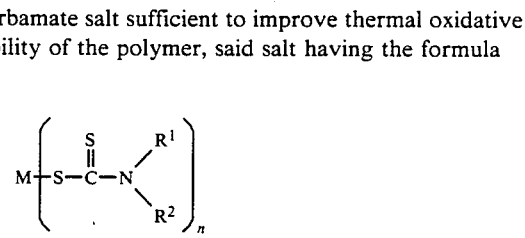

wherein $R^1$, $R^2$, $R^3$, and $R^4$ individually represent hydrocarbyl groups having from about 1 to about 20 carbon atoms, and M is a selected from the group consisting of metals of Group IIIB through Group VA, and mixtures thereof, and n is an integer equal to at least 1.

2. The composition of claim 1 wherein the linear alternating polymer has an average molecular weight of 10,000 to 50,000.

3. The composition of claim 2 wherein the olefinically unsaturated hydrocarbon is selected from the group consisting of alphaolefins having from 2 to 12 carbon atoms, and mixtures thereof.

4. The composition of claim 3 wherein the group consisting of alpha-olefins is ethylene and propylene.

5. The composition of claim 3 wherein the alpha-olefin is ethylene.

6. The composition of claim 3 wherein the amount of dihydrocarbyldithiocarbamate salt present is from about 0.01 to about 10 percent based on the weight of the polyketone.

7. The composition of claim 6 wherein the amount of dihydrocarbyldithiocarbamate salt present is from about 1.0 to about 3.0 percent based on the weight of the polyketone.

8. The composition of claim 6 wherein M is selected from the group consisting of zinc, cobalt, iron, copper, nickel and cadmium.

9. The composition of claim 6 wherein M is selected from the group consisting of lead and bismuth.

10. The composition of claim 8 wherein the dihydrocarbyldithiocarbamate salt is a dialkyldithiocarbamate salt.

11. The composition of claim 10 wherein the dialkyldithiocarbamate salt has from 1 to about 6 carbon atoms per alkyl group.

12. The composition of claim 11 wherein the dialkyldithiocarbamate salt is nickel dibutyldithiocarbamate.

13. The composition of claim 6 wherein the dihydrocarbyldithiocarbamate salt is a mixture of two or more dihydrocarbyldithiocarbamate salts.

14. A polymeric composition comprising a linear alternating polymer of carbon monoxide, ethylene and propylene containing from about 0.5 to about 5 percent of nickel dialkyldithiocarbamate.

15. Molded articles comprising the composition of claim 1.

16. A process for improving the thermal oxidative stability of a linear alternating polymer of carbon monoxide and at least one olefinically unsaturated hydrocarbon which comprises incorporating an effectively stabilizing amount of a dihydrocarbyldithiocarbamate salt having the formula

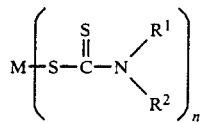

wherein $R^1$ and $R^2$ individually represent hydrocarbyl groups having from about 1 to about 20 carbon atoms, and M is a selected from the group consisting of metals of Group IIIB through VA, and mixtures thereof, and n is an integer equal to at least 1.

17. The process of claim 16 wherein the dihydrocarbyldithiocarbamate salt is a nickel dihydrocarbyldithiocarbamate.

18. A process for improving the thermal oxidative stability of a linear alternating polymer of carbon monoxide, ethylene and propylene which comprises incorporating from about 0.5 to about 5 percent of nickel dibutyldithiocarbamate.

* * * * *